Patented Sept. 22, 1925.

1,554,225

UNITED STATES PATENT OFFICE.

JOHN WESLEY MARDEN, OF EAST ORANGE, AND HENRY KNEELAND RICHARDSON, OF NEWARK, NEW JERSEY, ASSIGNORS TO WESTINGHOUSE LAMP COMPANY, A CORPORATION OF PENNSYLVANIA.

COMPOSITE REFRACTORY BODY.

No Drawing.   Application filed June 23, 1922. Serial No. 570,479.

*To all whom it may concern:*

Be it known that we, JOHN WESLEY MARDEN, a citizen of the United States, and a resident of East Orange, in the county of Essex and State of New Jersey, and HENRY KNEELAND RICHARDSON, a citizen of the United States, and a resident of Newark, in the county of Essex and State of New Jersey, have invented a new and useful Improvement in Composite Refractory Bodies, of which the following is a specification.

This invention relates to composite refractory ware and the method of producing the same. More particularly, it relates to a combination of refractory ceramic materials, one of which is thorium oxide.

An object of this invention is the provision of a method for economically and expeditiously producing refractory brick and other articles to at least part of the surface of which thorium oxide is affixed.

A special object of our invention is the production of composite brick particularly useful for lining furnaces subject to high temperatures.

Other objects will be apparent from a reading of the following description.

In practicing many metallurgical processes, it is desirable to prevent the contamination of the material undergoing treatment. This is particularly true when investigations are being made of the metals which require high temperature treatment. It is known that such refractories as magnesia, lime and even zirconia cannot be used in contact with metals having such high melting points as tungsten or molybdenum on account of the interaction between these metals and the refractory oxides mentioned. In the case of a lime crucible, for example, tungsten interacts with this oxide to yield volatile products which are probably calcium metal and tungstic oxide. For this reason and many others, attempts have been made to produce bricks and other articles, used in connection with metallurgical investigations, from the refractory oxides, especially thorium oxide. Inasmuch as thorium oxide, when highly heated, is one of the most refractory of substances and also because its chemical resistivity is very great it will be appreciated that an article, such as a brick or a crucible surfaced at least in part of pure thorium oxide will find considerable usage as a furnace lining in the metallurgy of metals having relatively high melting points.

Instead of employing thoria as practically the sole material for constituting a manufactured refractory article, it is found desirable for several reasons to produce a composite body having thoria as one of its constituents; for example, crucibles may be lined with thorium oxide and thereby serve the same purpose equally well if not better than a crucible consisting practically of thoria only. Such a composite crucible may be more desirable than a crucible of thoria not only from the standpoint of function but from that of economy.

It has been found that by properly preparing a suitable paste or slip of thorium oxide, the same may be firmly affixed by certain processes, as for example, by casting, to other ceramic refractory materials to form composite bodies such as crucibles, bricks, tubes and the like.

In practicing our invention, the first step consists in forming a suspension of thorium oxide of a suitable consistency for casting. This suspension, which is usually termed the "slip" in the ceramic industry, may be prepared by thoroughly grinding and mixing, by means of a ball mill, thorium oxide, a small quantity of another refractory material to serve as a filler, a binder salt, such, for example, as a double-fluoride salt which is adapted to serve as or functions similarly to a colloid and a small quantity of a suitable acid which will cause any colloid present to coagulate. When the mixture has been ground very fine it is mixed with about an equal part of thorium oxide which has been previously pulverized until it is very fine. This mixture or slip is then diluted with water to give a suitable consistency for casting, after which it may be cast on to the surface of a body of ceramic material such as fire clay. The composite body thus formed is then dried carefully so as to prevent cracking, after which it is subjected to a firing process.

Another important consideration is the drying of the casting, for, if the drying step is carried on too rapidly, the casting will crack. Generally speaking, the drying depends on the size of the article; the larger the article, the longer the time required for drying. Furthermore, the drying temperature should be gradually raised until the maximum temperature for dehydration has been reached, at which temperature the drying operation should be continued for a short interval.

In making a composite brick consisting in part of thoria, first prepare a mixture consisting of approximately nine parts of thoria which has been previously ignited at about 1300° C., about one part of zirconia, about one part of a double salt of a halide, such, for example, as potassium-thorium fluoride, potassium-zirconium fluoride, cryolite, or the like, and a one-half part of phosphoric or other suitable acid. The mixture is ball milled wet and, after it has been ground very fine in this way, it is mixed with an equal part of ignited thoria which has been pulverized in the mortar to pass a 200 mesh sieve. This mixture is diluted with water to give a suspension or slip of suitable consistency for casting.

This slip may then be poured over at least a portion of the surface of a fire clay brick to form a coating of any desired thickness. The composite body thus formed is then allowed to dry. In drying, it is important to avoid cracking the material and therefore the preferable procedure in performing this step is as follows. The composite brick should be placed in a drying oven and brought gradually from room temperature to about 60° C. within a period of about 24 hours. The partly dried brick is then heated to about 120° C. to expel the remaining moisture. This heat treatment is continued for about two hours, or until practically all moisture has been expelled.

The brick is next fired by being placed in any suitable furnace. The temperature of the furnace is gradually increased until a temperature equal to the sintering temperature of the fire clay has been attained, which may vary from about 1400° C. to 1800° C. During the firing process, most of the salts volatilize, the final composition of the brick being practically a base of fire clay covered with thoria containing a slight amount of zirconia. The brick, upon removal from the furnace, should be permitted to cool slowly.

While one method for producing a composite refractory material has been described in detail, it is to be understood that minor modifications may be made without affecting the scope of the invention which is limited only by the appended claims.

What is claimed is:

1. As an article of manufacture a composite body comprising a ceramic refractory material to at least part of the surface of which a substantial layer of practically pure thorium oxide is affixed.

2. A composite refractory body comprising a mass of fire clay as a base to at least part of the surface of which substantially pure thorium oxide is affixed.

3. As an article of manufacture a composite brick comprising a ceramic refractory material to the surface of which, at least in part, a coating of substantial thickness of practically pure thorium oxide is affixed.

4. As an article of manufacture a composite brick comprising fire clay as a base to the surface of which, at least in part, pure thorium oxide is affixed.

5. As an article of manufacture a ceramic body having a surface area thereof covered with a mixture of pure thorium oxide and a small portion of substantially pure zirconium oxide.

6. As an article of manufacture a composite body of refractory ceramic material having as a surface portion of substantial thickness, a mixture of pure thorium and zirconium oxides.

7. As an article of manufacture a composite refractory body comprising a portion of ceramic material and a highly refractory composition containing pure thorium oxide and a small portion of substantially pure zirconium oxide affixed thereto.

8. The method of producing a composite refractory body which comprises preparing a slip of finely divided thorium oxide, a salt adapted to function similarly to a colloid, a medium adapted to precipitate any colloid and to produce a suitable consistency for casting, subsequently applying the thus formed slip to ceramic material and drying.

9. The method of producing a composite refractory body which comprises preparing a paste comprising finely divided thorium oxide, a filler, a double salt adapted to serve as a colloid, a coagulating medium and a sufficient quantity of fluid to produce a suitable consistency for casting, subsequently applying said paste to a ceramic material, drying the composite body and later firing the same.

10. The method of producing a composite refractory body which comprises preparing a paste comprising finely divided thorium oxide, a filler such as zirconia, a double salt adapted to serve as a colloid, such as potassium-thorium fluoride, potassium-zirconium fluoride, cryolite and the like, a coagulating medium such as phosphoric acid and the like and a sufficient quantity of fluid to produce a suitable consistency for casting, subsequently coating said paste upon a mass of ceramic material such as fire clay, drying the composite body and later firing the same.

11. The method of producing a composite refractory article which consists in forming a paste by ball milling in the wet state a mixture of about nine parts thoria, about one part zirconia, about one part potassium-thorium fluoride and about one-half part phosphoric acid then mixing with said paste an equal part of ignited thoria, subsequently forming a slip of suitable consistency for casting by adding water, casting said slip on a body of ceramic material, drying the composite body thus formed and subsequently firing the same.

In testimony whereof, we have hereunto subscribed our names this 22nd day of June, 1922.

JOHN WESLEY MARDEN.
HENRY KNEELAND RICHARDSON.